United States Patent
Cheng et al.

(10) Patent No.: US 7,712,720 B1
(45) Date of Patent: May 11, 2010

(54) RESIZABLE DEVICE STAND

(75) Inventors: Gang Cheng, Shenzhen (CN);
Meng-Hua He, Shenzhen (CN);
Chun-Che Yen, Taipei Hsien (TW);
Yu-Tao Chen, Taipei Hsien (TW);
Te-Sheng Jan, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/437,527

(22) Filed: May 7, 2009

(30) Foreign Application Priority Data

Dec. 22, 2008 (CN) .......................... 200810306422

(51) Int. Cl.
*A47G 29/00* (2006.01)

(52) U.S. Cl. .............................. 248/346.07; 248/205.5; 248/206.2; 248/316.4; 379/455

(58) Field of Classification Search ............ 248/346.07, 248/683, 205.2, 205.7, 205.8, 206.1, 316.4, 248/316.2, 316.6, 231.21, 231.61, 231.85, 248/157, 415, 416, 418; 379/446, 455
See application file for complete search history.

(56) References Cited

U.S. PATENT DOCUMENTS

| | | | | |
|---|---|---|---|---|
| 4,657,216 A * | 4/1987 | Southgate | ................. | 248/187.1 |
| 5,121,863 A * | 6/1992 | Kotitalo et al. | .............. | 224/570 |
| 5,788,202 A * | 8/1998 | Richter | ..................... | 248/316.4 |
| 5,903,645 A * | 5/1999 | Tsay | ........................... | 379/455 |
| 6,749,160 B1 * | 6/2004 | Richter | ..................... | 248/206.2 |
| 6,944,294 B2 * | 9/2005 | Tsay | ........................... | 379/446 |
| 7,441,734 B2 * | 10/2008 | Liou | ........................ | 248/205.5 |
| 7,527,230 B2 * | 5/2009 | Chiang et al. | ............. | 248/205.5 |

\* cited by examiner

*Primary Examiner*—Anita M King
(74) *Attorney, Agent, or Firm*—Zhigang Ma

(57) ABSTRACT

A resizable device stand includes a suction base, an adjusting module mounted on the suction base, and a load-supporting module mounted on the adjusting module. The load-supporting module includes a housing, a pair of clamps, elastic pieces, and a wedge. The housing defines a first channel and a second channel therein. The clamps include vertical parts and horizontal parts. The horizontal parts are received in the first channel. The vertical parts extend upwardly from the housing. The elastic pieces are configured for driving the clamps to clamp the device. The wedge is received in the second channel, configured to press and open the clamps via the interaction of the inclined surfaces when receiving a user operation. The stand is adapted for supporting different types and sizes of devices.

6 Claims, 7 Drawing Sheets

RESIZABLE DEVICE STAND

BACKGROUND

1. Technical Field

The present disclosure relates to a device stand.

2. Description of Related Art

A motor vehicle may be used by different drivers who each have their mobile device they would like to be supported by a stand in the vehicle, or a single driver may use different devices at different times. Because stands are usually adapted for a specific device type and size, many different stands must be available in the vehicle, which can be unsightly and waste space.

What is needed is a resizable stand adapted for supporting different types and sizes of devices.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
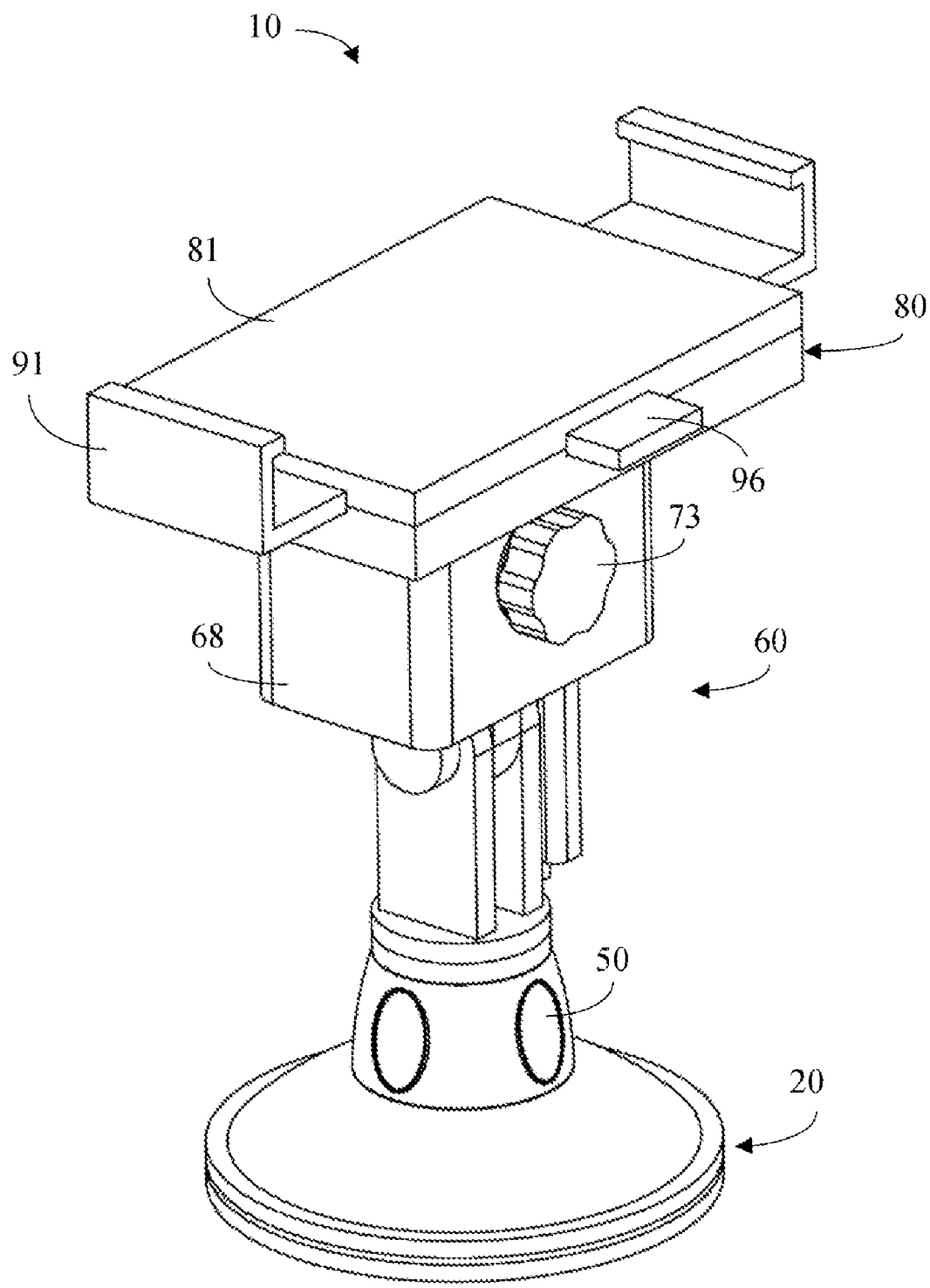
FIG. 1 is a schematic, isometric view of a stand according to an exemplary embodiment, the stand including a suction base, an adjusting module, and a load-supporting module.

Referring to FIG. 1, a stand 10 according to an exemplary embodiment is disclosed. The stand 10 includes a suction base 20, an adjusting module 60 mounted on the suction base 20, and a load-supporting module 80 mounted on the adjusting module 60.

Figure 2:
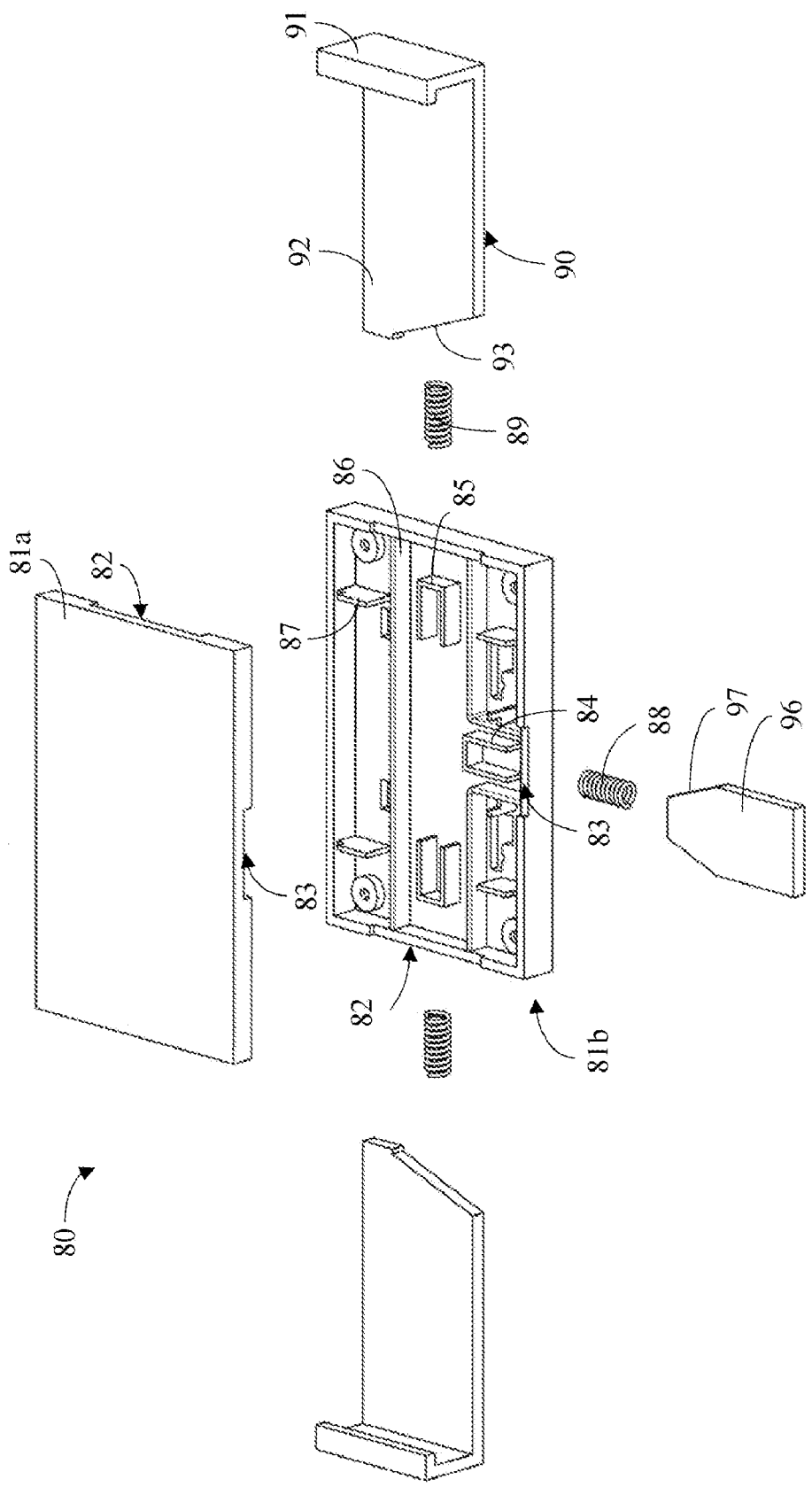
FIG. 2 is an exploded view of the load-supporting module of FIG. 1.
Figure 3:
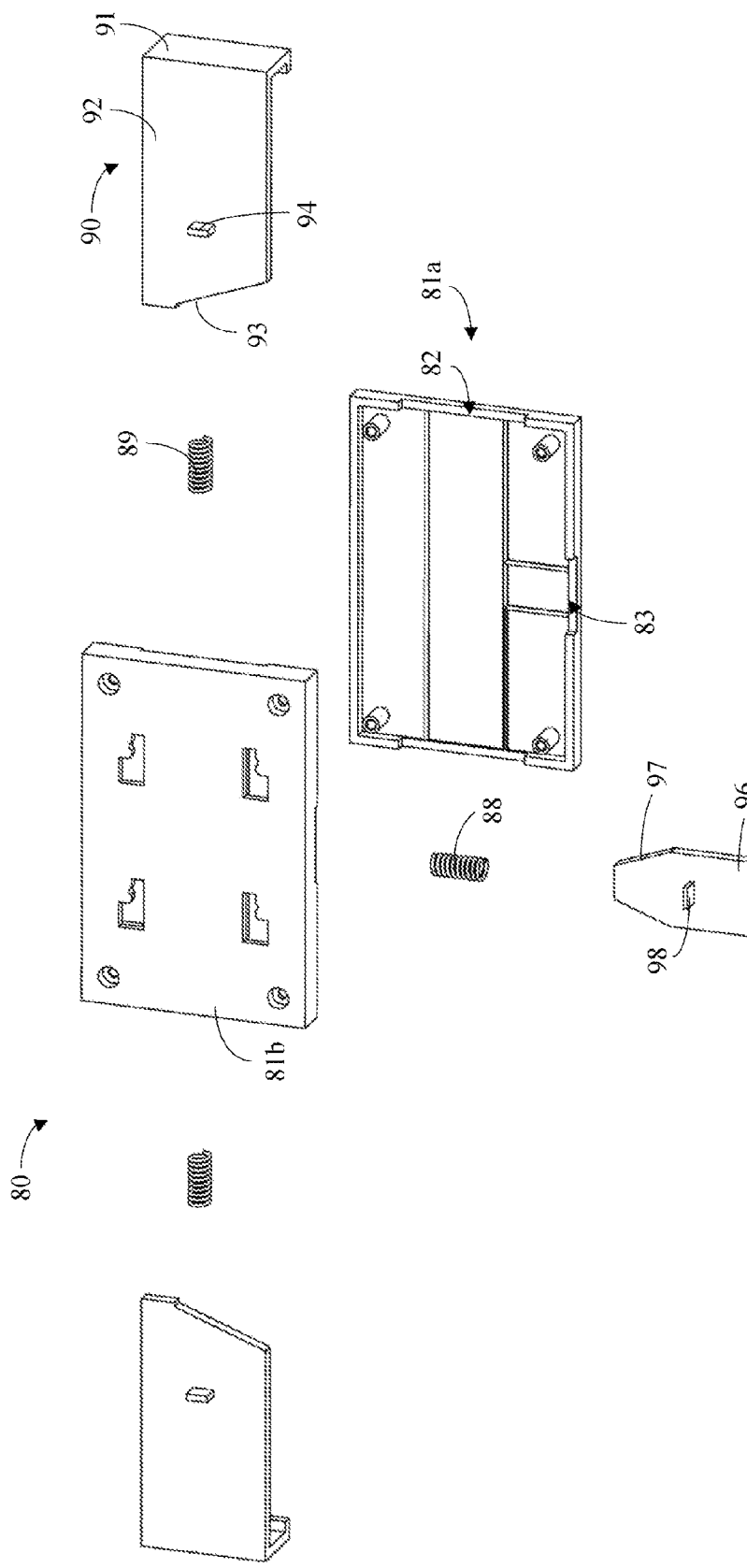
FIG. 3 is a reversed view of FIG. 3.
Figure 4:
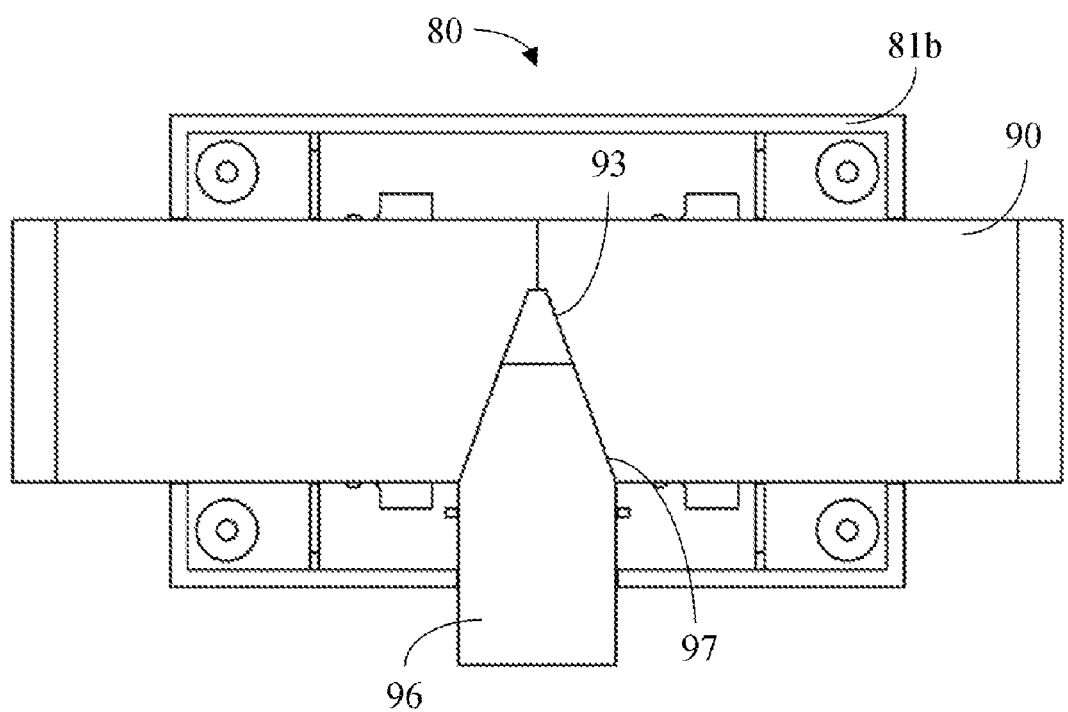
FIG. 4 is a top plan view of the load-supporting module of FIG. 1, with a top cover removed.

Referring also to FIGS. 2-4, the load-supporting module 80 includes a housing 81 to house a pair of clamps 90, a wedge 96, and elastic pieces 88, 89.

The housing 81 is rectangular, and includes a top cover 81a and a bottom cover 81b. The top cover 81a and the bottom cover 81b cooperatively define a channel 82 and a channel 83. The channel 82 is for receiving the clamps 90, and the channel 83 is for receiving the wedge 96 therein. The channel 82 communicates with the channel 83. In this embodiment, the channels 82, 83 are formed by rails 86, limiting pieces 87, and openings in sidewalls of the housing 81. The bottom cover 81b further carries U-shaped blocks 84, 85 for receiving the elastic pieces 88, 89.

The clamps 90 are L-shaped, and includes vertical parts 91 and horizontal parts 92. The horizontal parts 92 include inclined surfaces 93 at ends far away from the vertical parts 91. The horizontal parts 92 are received by the channel 82 of the housing 81. Referring to FIG. 1, the vertical parts 91 extend upwardly from the horizontal parts 92 and positioned on two opposite sides of the housing 81, respectively. The clamps 90 further include stop pieces 94 extending downwardly from the horizontal parts 92. After assembly, the stop pieces are positioned at the openings of the U-shaped blocks 85. The elastic pieces 89 are received in the U-shaped blocks 85 and resiliently against the stop pieces 94, thus to cause the clamps 90 to clamp a device firmly.

The wedge 96 is received in the channel 83. One end of the wedge 96 extends out of the housing 81 for receiving a user operation. The other end of the wedge 96 has inclined surfaces 97 for pressing the inclined surfaces 93 of the clamps 90, thus to open the clamps 90. The wedge 96 further includes stop piece 98 extending downwardly therefrom. After assembly, the stop piece 98 is positioned on the openings of the U-shaped blocks 84. The elastic piece 88 is received in the U-shaped block 84 and resiliently presses against the stop piece 98, thus to prevent the wedge 96 from extending further to the clamps 90.

When loading the device to the load-supporting module 80, first, press the wedge 96, and the wedge 96 presses the clamps 90 correspondingly, thus to open the clamps 90. Second, put the device on the housing 81 between the clamps 90. Third, loosen the wedge 96, and the elastic piece 88 cause the clamps 90 to clamp the device firmly. In addition, the distance between the clamps 90 can be varied for clamping different size devices.

When unloading the device from the load-supporting module 80, press the wedge 96 to open the clamps 90, then the device can be unloaded from the load-supporting module 80.

Figure 5:
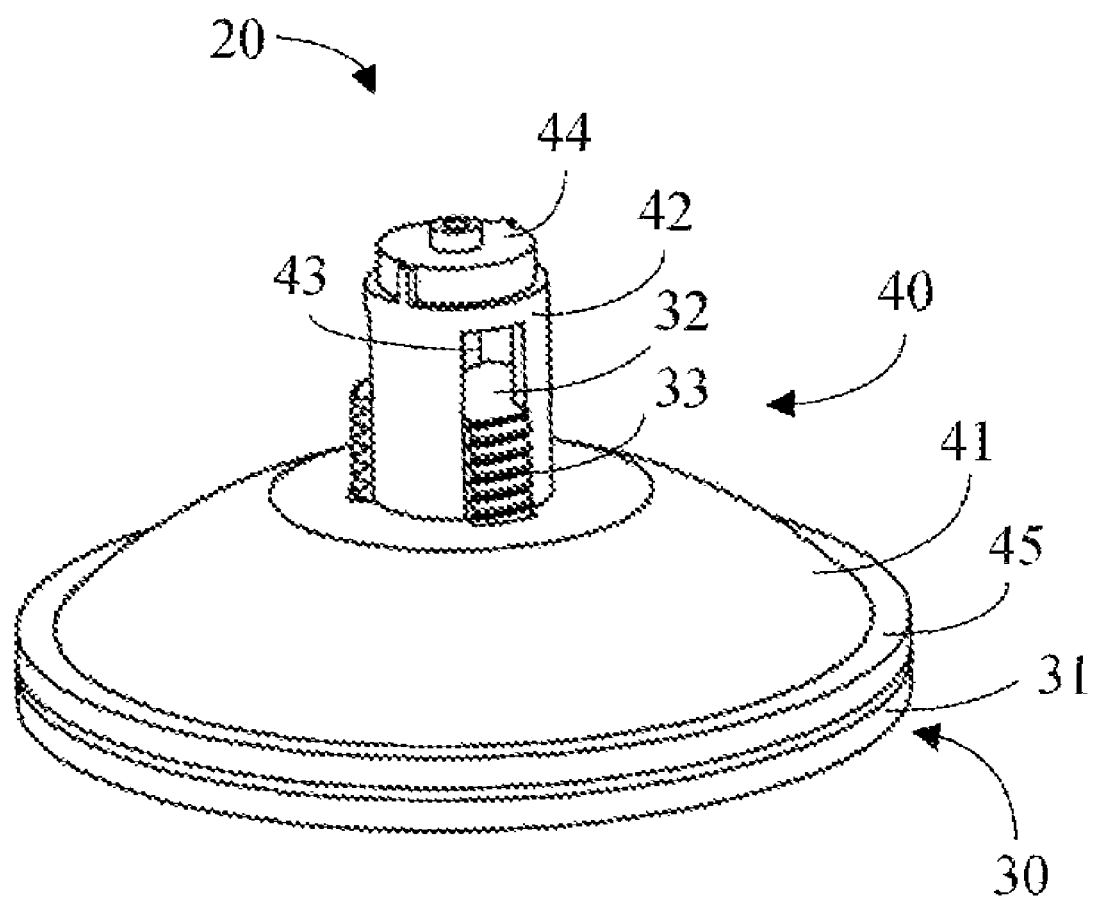
FIG. 5 is a schematic, isometric view of the suction base of FIG. 1.
Figure 6:
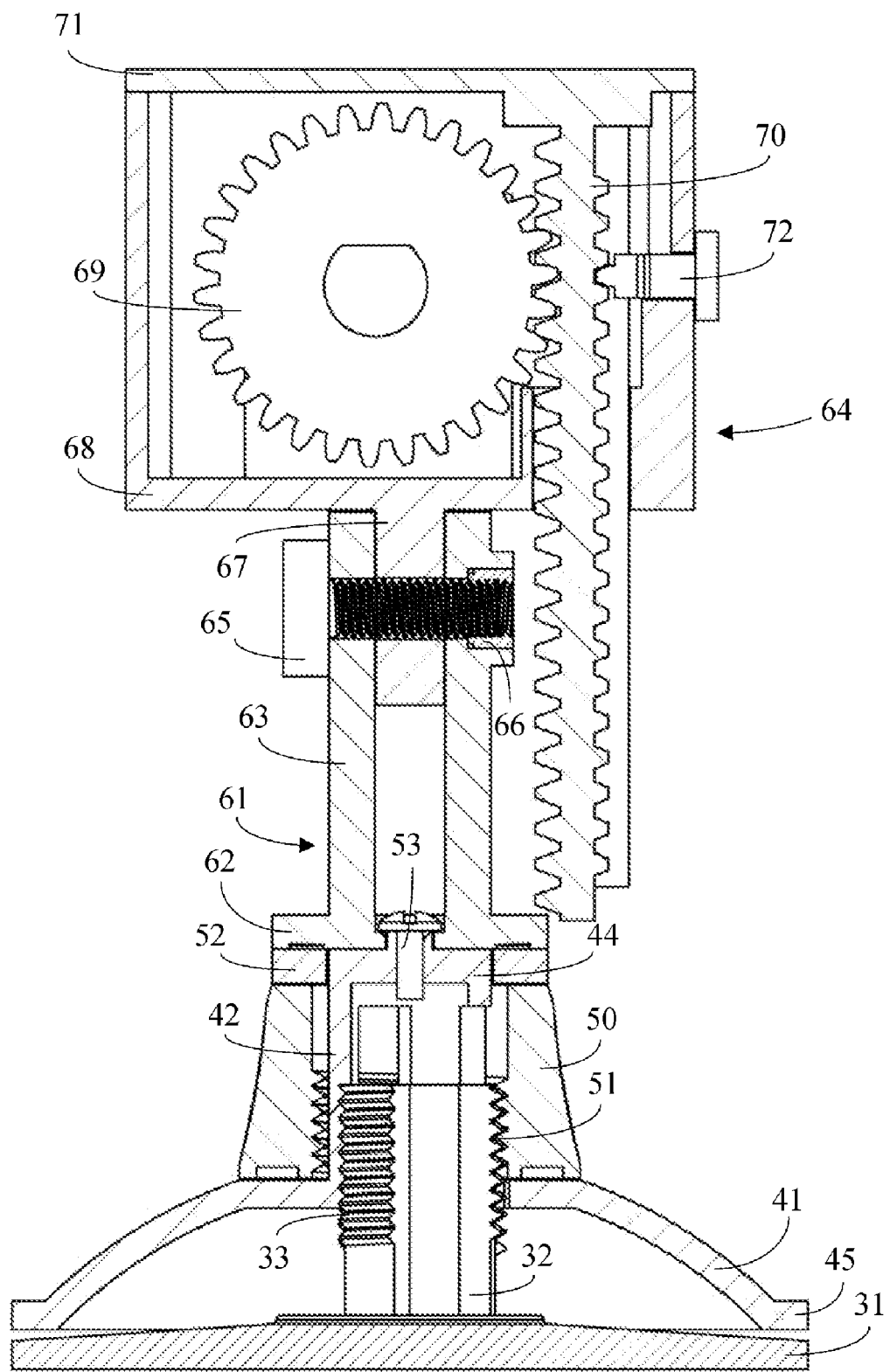
FIG. 6 is a section view of the suction base and the adjusting module of FIG. 1 without a vacuum seal created.

Referring to FIGS. 5 and 6, the suction base 20 includes a suction piece 30, a fixing structure 40 for fitting over the suction piece 30, a rotatable sleeve 50, and a washer 52.

The suction piece 30 includes a membrane 31 and a shaft 32 extending upwardly from the membrane 31. The shaft 32 includes an external thread 33. Grooves (not shown) are formed on the shaft 32 along an axial direction, and make the external thread 33 to protrude from the surface of the shaft 32.

The fixing structure 40 includes a shaft housing 41 and a sleeve 42 extending upwardly from the shaft housing 41, and lower edge of the housing 41 forms a flange 45. The sleeve 42 defines axial running slots 43. The external thread 33 protrudes out of the sleeve 42 through the running slots 43.

The rotatable sleeve 50 is fit over the sleeve 42. The rotatable sleeve 50 includes an internal thread 51. The internal thread 51 cooperates with the external thread 33 of the shaft 32, thus, a rotation of the rotatable sleeve 50 will bring an axial movement of the shaft 32.

The washer 52 is non-rotatably fit over a thin top part 44 of the sleeve 42.

Figure 7:
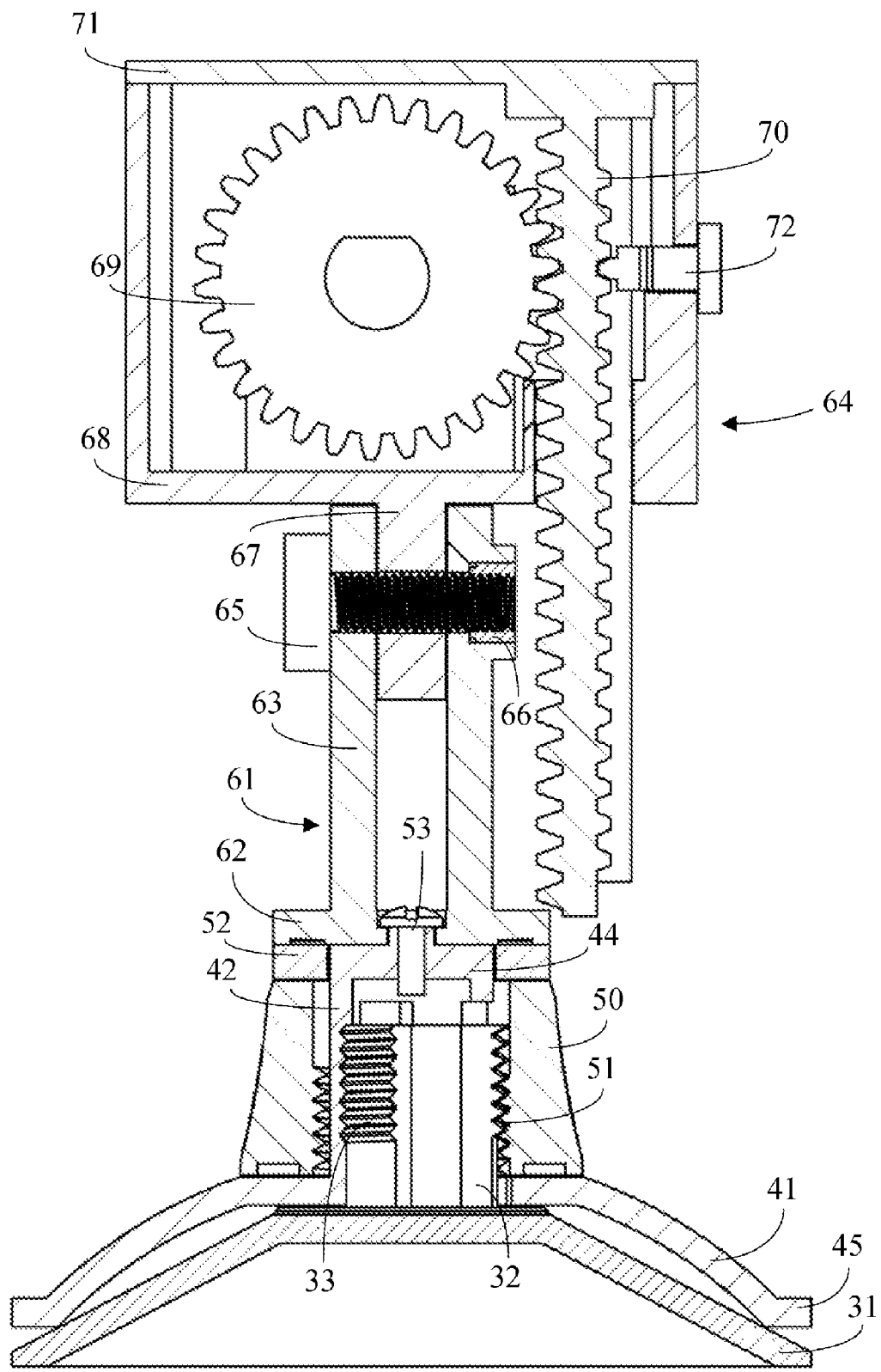
FIG. 7 is a section view of the suction base and the adjusting module of FIG. 1 with a vacuum seal created.

Referring to FIGS. 6 and 7, in use, put the suction base 20 on a flat surface, and ensure the membrane 31 is flush against the surface. Then, the rotatable sleeve 50 is grasped and rotated, while holding the base 20 against the surface. During the rotation of the sleeve 50, the shaft 32 are driven to move up, pulls only a central portion of the membrane 31 away from the contacting surface, as the edge of the membrane 31 is limited by the flange 45 of the shaft housing 41. In this way, a vacuum seal is formed between the membrane 31 and the contact surface. In this way, the suction base 20 is fixed on the surface.

The suction base 20 can be easily removed from the flat surface by rotating the rotatable sleeve 50. In this way, the membrane 31 is driven to move down, the vacuum between the membrane 31 and the flat surface is eliminated, and the suction base 20 is no longer fixed on the flat surface.

Referring to FIGS. 1 and 6, the adjusting module 60 includes a rotatable structure 61 and a rack and pinion assembly 64.

The rotatable structure 61 includes a chassis 62 and two opposed walls 63 extending upwardly from the chassis 62. The chassis 62 is above the washer 52. A screw 53 connects the chassis 62 to the sleeve 42. The chassis 62 is rotatable around the screw 53.

The rack and pinion assembly 64 includes a gearbox 68, a gear 69, a rack 70, a knob 73, and a locking piece 72. A connecting piece 67 extends downwardly from the gearbox 68. The connecting piece 67 is positioned between the walls 63. A screw 65 extends through the walls 63 and the connecting piece 67, and cooperates with a nut 66. The cooperation of the screw 65 and the nut 66 can be loosed, thus the gearbox 68 is rotatable around the screw 65; or the cooperation can be tightened, thus the gearbox 68 is fixed at a position.

The gear 69 is mounted in the gearbox 68 and meshes with the rack 70. The rack 70 extends vertically. A plate 71 is fixed on an upper end of the rack 69. The plate 71 carries the load-supporting module 80. The knob 73 is fixed with the gear 69. A rotation of the knob 73 drives the rack 69 to move up and down, thus to adjust the height of the load-supporting module 80. The locking piece 72 is movably mounted on the gearbox 68. The locking piece 72 is configured to lock or unlock the rack 69.

The rotation direction of the rotatable structure 61 is perpendicular to the rotation direction of the rack and pinion assembly 64, thus, the load-supporting module 80 above the adjusting module 60 can maintain a variety of attitudes.

Moreover, it is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A resizable device stand comprising:
   a suction base;
   an adjusting module mounted on the suction base; and
   a load-supporting module mounted on the adjusting module, the load-supporting module comprising:
      a housing defining a first channel and a second channel therein, wherein the first channel communities with the second channel;
      a pair of clamps each comprising a vertical part and a horizontal part, wherein the horizontal part comprise a first inclined surface, the horizontal part is received in the first channel, the vertical part extends upwardly from the horizontal part and positioned on a side of the housing;
      elastic pieces configured for driving the clamps to clamp a device; and
      a wedge received in the second channel, wherein the wedge comprises second inclined surfaces corresponding to the first inclined surfaces, and the wedge is configured to press and open the clamps via the interaction of the inclined surfaces when receiving a user operation.

2. The stand of claim 1, wherein the housing comprises rails, limiting pieces, and openings in sidewalls thereof to form the channel.

3. The stand of claim 1, wherein the housing is rectangular.

4. The stand of claim 1, wherein the housing further comprises U-shaped blocks for receiving the elastic pieces, the clamps comprise stop pieces at the opening of the U-shaped blocks, the elastic pieces resiliently press the stop pieces.

5. The stand of claim 1, further comprising a second elastic piece for causing the wedge to leave the clamps.

6. The stand of claim 5, wherein the housing further comprises a U-shaped block for receiving the second elastic piece, the wedge comprises a stop piece at the opening of the U-shaped block, the second elastic piece resiliently press the stop piece.

* * * * *